United States Patent [19]

Austin

[11] Patent Number: 5,332,618
[45] Date of Patent: Jul. 26, 1994

[54] ANTIREFLECTION LAYER SYSTEM WITH INTEGRAL UV BLOCKING PROPERTIES

[75] Inventor: R. Russel Austin, Novato, Calif.

[73] Assignee: Tru Vue, Inc., Chicago, Ill.

[21] Appl. No.: 832,790

[22] Filed: Feb. 7, 1992

[51] Int. Cl.$^5$ ............................................. G02B 5/22
[52] U.S. Cl. ................................. 428/216; 359/359;
  359/580; 428/212; 428/336; 428/428; 428/432;
  428/701; 428/702; 428/704; 428/913
[58] Field of Search ................. 359/359, 580; 428/216,
  428/336, 701, 702, 432, 704, 913, 428, 212

[56] References Cited

U.S. PATENT DOCUMENTS

| | | | |
|---|---|---|---|
| 3,432,225 | 3/1969 | Rock | 350/166 |
| 3,565,509 | 2/1971 | Sulzbach | 350/164 |
| 3,781,090 | 12/1973 | Sumita | 350/164 |
| 3,960,441 | 6/1976 | Kamiya et al. | 350/164 |
| 4,387,960 | 6/1983 | Tani | 350/164 |
| 4,461,532 | 7/1984 | Sato et al. | 359/359 |
| 4,805,989 | 2/1989 | Nakajima | 359/580 |
| 5,105,310 | 4/1992 | Dickey | 359/586 |
| 5,147,125 | 9/1992 | Austin | 359/359 |

Primary Examiner—A. A. Turner
Attorney, Agent, or Firm—Robert E. Browne; Thomas C. McDonough

[57] ABSTRACT

The present invention is directed to an anti-reflection and UV rejection coating. The coating comprises at least eight layers wherein adjoining layers alternate between high and low refractive index materials. The layer adjacent an article on which the coating is formed has a high refractive index greater than about 2.10 at a wavelength of about 520 nanometers and greater than about 2.50 at a wavelength of about 330 nanometers. The index of refraction of the low refractive index material is less than about 1.50 at a wavelength of about 520 nanometers. The two layers of low refractive index material nearest the article each have an optical thickness at a wavelength of about 330 nm of about one-quarter wavelength.

8 Claims, 8 Drawing Sheets

ANTIREFLECTION LAYER SYSTEM WITH INTEGRAL UV BLOCKING PROPERTIES

BACKGROUND OF THE INVENTION

It has been known that exposure to very bright sunlight can cause damage to the retina. Thus, sunglasses should not only reduce the level of visible light entering the eye but also possess ultraviolet (UV) light blocking capabilities. Surprisingly, there is no real consensus on what is an acceptable level of UV exposure. Some may need sunglasses while others do not. Those that wear sunglasses can enjoy some protection, while others, if the warnings are correct, may sustain some damage, however slight.

It has also been known that art and photographic works deteriorate when exposed for long periods to sunlight or even to fluorescent light. Again, there are no established standards concerning the time and level of exposure. Also, different dyes and pigments held in a variety of different solvents and binders in different works will be effected differently.

Various approaches have been suggested to eliminate or reduce the unwanted effects of UV light in these applications. Certain resins and plastics have been developed which, either due to their own structure and composition, or when used as a host matrix for other substances which have the necessary properties, will block UV radiation by absorption. The plastic materials may be used in various ways such as a glazing material, as a laminated element in a multi-component glazing, or as an optical element in ophthalmic applications.

The typical performance of two different plastic materials, produced by the Rohm and Hass Company, Philadelphia, Pa., and designated UF 3 and UF 4, is shown in FIG. 1. The longer wavelength blocking material UF 3 (curve 20) imparts a slight yellow tint. The shorter wavelength blocking material UF 4 (curve 22) imparts no perceptible tint to the transmitted light.

Resin formulations are typically based on silicon siloxane resins containing appropriate additives. They are designed to be coated on glass or UV transparent plastic by spinning or roll coating and then are heat cured. The performance of such products compares with the plastic materials UF 3 and 4.

Certain special glass compositions have also been developed which through the use of oxides of cerium and other materials will effectively block UV radiation. The use of these glass compositions seems to be confined to space and military applications, such as protective covers for silicon solar cell arrays. These compositions apparently have not been used extensively for corrective spectacles, sunglasses, or as protective glazings for art and photographic works.

The present invention relates to a special thin film multilayer structure which is dispersive and absorbing in the near ultraviolet region of the spectrum. The structure may be deposited as a coating in a single operation. It provides antireflection and UV blocking properties.

It may be applied to a wide range of glasses and plastics, and it does not require any special formulations of these materials. It offers a more economical means of providing both UV and anti-glare protection than if these properties were realized by separate process steps or separate structural elements.

The present invention makes use of the fact that the refractive index and absorption coefficient of certain dielectric materials rises rapidly at wavelengths shorter than 450 nanometers (nm). It is an improvement over the type of multilayer coating described by Rock in U.S. Pat. No. 3,432,225 and Sulzbach in U.S. Pat. No. 3,565,509, both of which are hereby incorporated by reference. The coatings disclosed in those patents use two or more relatively thin films to replace the quarter wave film next to the substrate in the classical three layer "Quarter, Half, Quarter" system. This system was originally described by Lockhart and King in "Three-Layered Reflection-Reducing Coatings", J. Opt. Soc. Am., Vol. 37, pp. 689–94 (1947), which is also incorporated herein by reference.

The Lockhart and King structure comprises three films in which the outer film has an optical thickness of approximately one-quarter wavelength in the visible spectrum and a refractive index (N) less than that of a glass substrate (N=1.52). The second film has an optical thickness of one-half wavelength and a relatively high refractive index, e.g. on the order of 2.10. The third or inner film has an optical thickness of one-quarter wavelength and a refractive index less than that of the second or half-wave film but greater than the glass substrate, e.g., on which the structure is deposited.

The Rock structure, described in U.S. Pat. No. 3,432,225, replaces the inner film adjacent the substrate of the Lockhart and King structure with two films. The refractive index of the innermost film of the two films is equal to that of the half-wave film. The other film has a refractive index equal to the low index outer film. The thickness relationship of the films is altered slightly to optimize performance. Specifically, the optical thickness of the two outermost films remain about the same, while the optical thickness of the two innermost films are each about one-eighth of a wavelength at 520 nm (the design wavelength). The two-film substitution is effective not only in simulating the index of the film that has been replaced but also provides an additional reflecting boundary which extends the effective spectral range of the structure. The total optical thickness of the Lockhart and King, and Rock structures are very nearly the same.

SUMMARY OF THE INVENTION

The present invention is directed to an anti-reflection and UV rejection coating. The coating comprises at least eight layers wherein adjoining layers alternate between high and low refractive index materials. The layer adjacent an article on which the coating is formed has a high refractive index greater than about 2.10 at a wavelength of about 520 nm and greater than about 2.50 at a wavelength of about 330 nm. The index of refraction of the low refractive index material is less than about 1.50 at a wavelength of about 520 nm. The two layers of low refractive index material nearest the article each have an optical thickness at a wavelength of about 330 nm of about one-quarter wavelength. The coating may be formed on one or both surfaces of an article such as a transparent substrate.

The present invention, in its simplest form, involves replacing the film next to the substrate in a Lockhart and King structure with a system of six layers, having a total thickness of approximately three-quarters of a wavelength in the green region of the spectrum, i.e., at about 520 nm. The present invention may also be viewed as replacing the base film in a Rock-type structure with a system of five layers.

Two of the films of the system of the present invention, the innermost low index films, are held at a specific optical thickness, each equal to about one-quarter wavelength at a wavelength of approximately 330 nm. The thicknesses of the remaining films are adjusted and optimized using, preferably, computer optimization techniques to provide the lowest possible reflection across the visible spectrum. The thicknesses of the remaining films in the basic Lockhart and King structure are also modified to accommodate the substitution which has replaced the base film.

Fixing the thickness of the two, innermost low index films in the base structure causes the phase relationship with the high index films to be such that the strong dispersion of the high index films is amplified, causing a very rapid rise in the reflection value in the near UV. This combined with the increase in absorption at even shorter wavelengths reduces UV transmission to less than 10% per surface at 350 nm. The effect is even more dramatic when both surfaces are coated which is usual in antireflection coating practice.

DESCRIPTION OF THE PREFERRED EMBODIMENTS

An understanding of the present invention is best gathered from considering certain properties of multilayer, dielectric structures known as long wavelength pass filters. Specifically, these are multilayer assemblies of alternating layers of transparent high and low refractive index (N) materials. The basic structure of such a system is:

$$(0.5H \ L \ 0.5H)^n \quad (1)$$

In Equation (1), H represents a layer of high index material having an optical thickness of one-quarter wavelength at some wavelength $\lambda_o$, and L represents a layer of low index material having an optical thickness of one-quarter wavelength at the same wavelength $\lambda_o$. Therefore, 0.5H is one-eighth of one wavelength thick at the wavelength $\lambda_o$. The three layers in parentheses are called the basic group. The superscript n is called the group repetition number. If n were, for example, three, the structure would be:

$$0.5H \ L \ H \ L \ H \ L \ 0.5H \quad (2)$$

Figure 1:
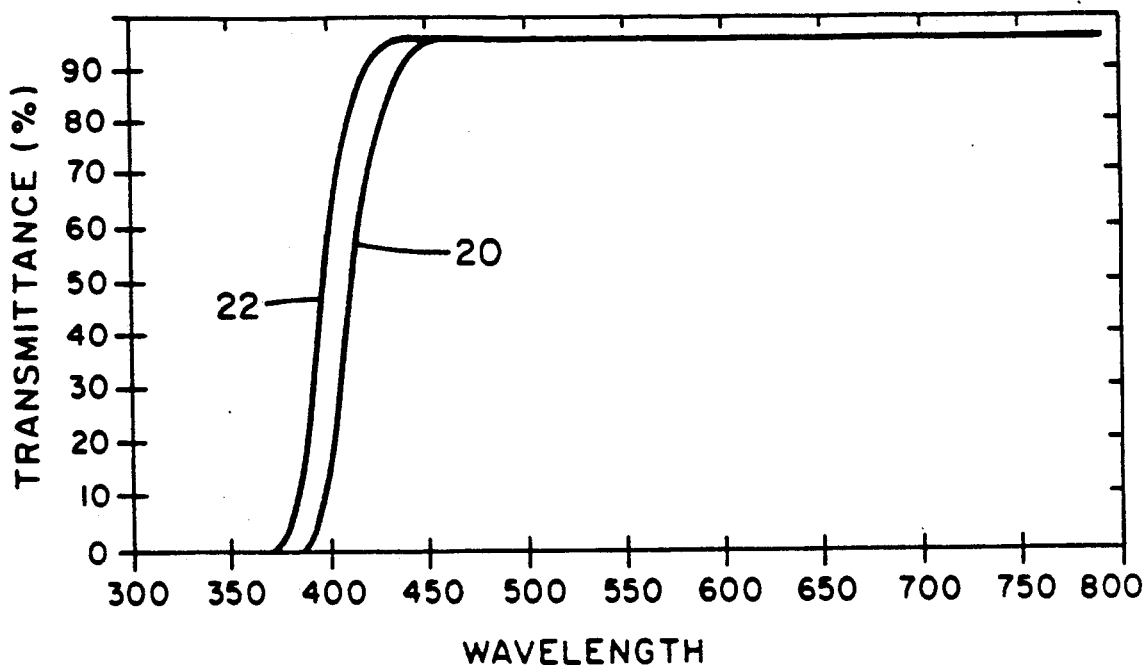
FIG. 1 is graph illustrating transmission values for certain UV absorbing plastic materials.
Figure 2:
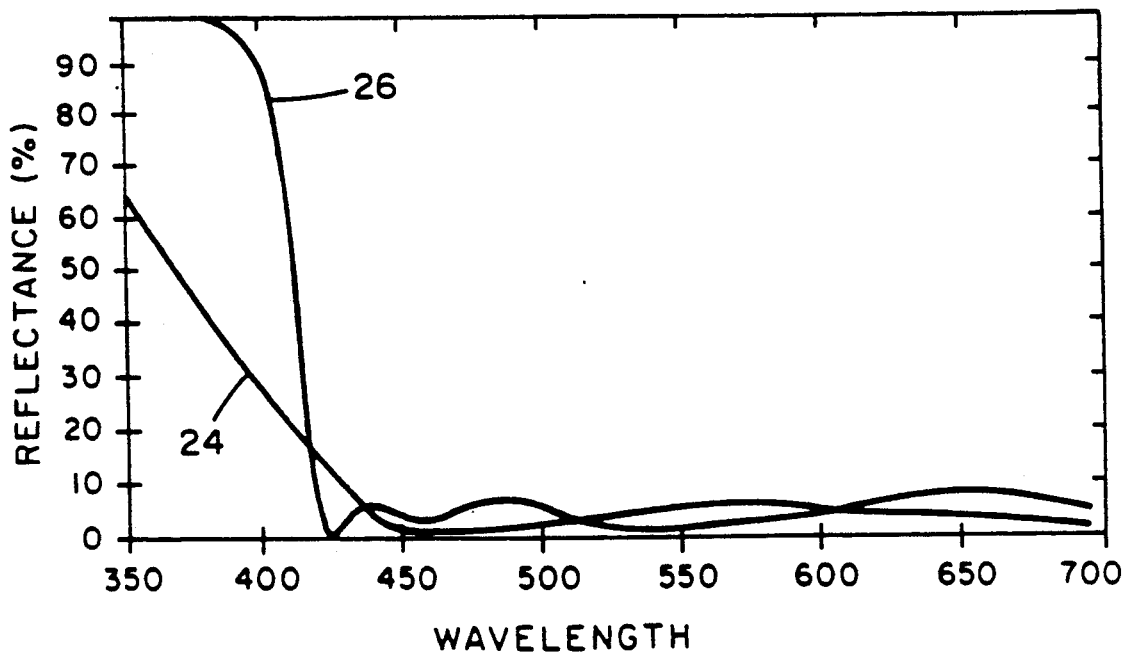
FIG. 2 is a graph illustrating reflectance values for certain multilayer dielectric structures.

The structure will provide a wavelength selective reflection value which is a function of the ratio of the high (H) and low (L) refractive index values and the group repetition number n. The reflection bandwidth of the structure is dependent on the refractive index ratio only. FIG. 2 is a plot of the reflection versus wavelength for systems of hypothetical non-absorbing, non-dispersive materials with indices of refraction of 2.3 (H) and 1.46 (L). Curves 24 and 26 represent structures having group repetition numbers n=2 and 8, respectively, wherein the structures have been deposited on one side of a glass article or surface. The index of refraction of the glass is 1.52, and curves 24 and 26, like the remaining plots discussed herein, are based on computational rather than experimental data. The refractive index and extinction coefficient values used in the computations are accepted values in the art for such computations.

It can be seen from the curves 24 and 26 that as n increases, the ripples or modulations in the passband increase. Note that when n=2 (curve 24) only one ripple appears in the visible spectral region, and that when n=8 (curve 26) three ripples are evident.

Techniques have been devised for optimizing transmission and reducing passband modulation. See Baumeister P. W., 1958 *J. Opt. Soc. Am.* 48, 955-58. These techniques involve symmetrically and gradually varying the film thicknesses from the center film in the stack or structure to the extremities or outer films of the stack. The more films in the stack, the smaller the differences between the films, and therefore, the more accurate must the deposition of an individual film be.

If the center film is reduced and the thickness of the film on either side of it is increased, while all other films retain their original thickness, only the ripple nearest the reflection band edge will be reduced, while the remaining ripples may even be increased. The variation in thickness of these films from nominal can be quite substantial, up to 15 percent, and the actual value of the change is less important than in the case where all films in the stack are varied to reduce all ripples. This design device was first presented in Austin R. R., 1975 *Proc. SPIE* 50, 143-52.

Figure 3:
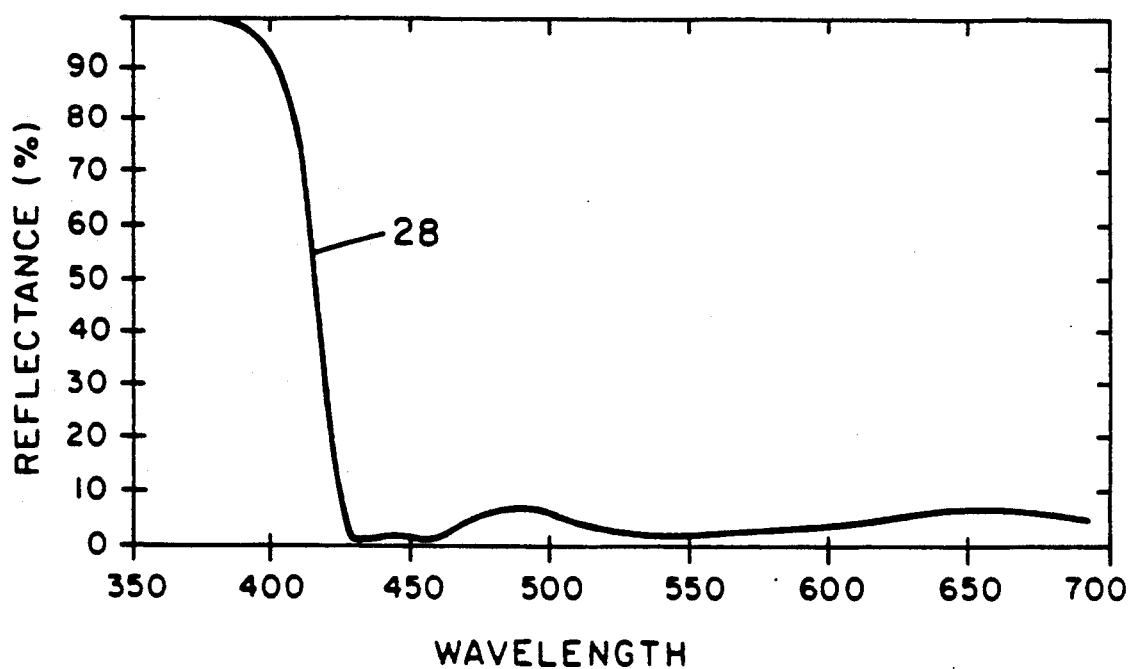
FIG. 3 is a graph illustrating reflectance values for a certain multilayer film structure.

The reflection versus wavelength plot (curve 28) for a structure using this technique is shown in FIG. 3. Again, the hypothetical non-dispersive, non-absorbing refractive indices of 2.3 (H) and 1.46 (L) were used in computing the plot. The group repetition number n was set at 8 and the center film was decreased in thickness by 15 percent, while the films on either side were increased in thickness by 15 percent.

In the concept of the present invention, a three film structure with the two outer films fixed at an optical thickness appropriate to cause a reflection increase in a desired wavelength range, and the center film varied to cause a reflection decrease in a desired transmission range, is very important. Such a structure can easily be integrated into typical broadband, multilayer, antireflection coating systems to reinforce the reflection rise on the short wavelength side of the antireflection zone without a significant compromise in antireflection performance.

Previously, a structure was discussed where the group repetition number n was 2, i.e. a five film system with three main films bounded by two films having a thickness substantially less than one-quarter wave. It was shown that only one ripple is present in the visible spectrum. This is the region in which it is desired to maximize transmission and reduce reflection. This ripple is, in fact, the nearest ripple to the stop band, i.e. the region of very low or no transmission.

Figure 4:
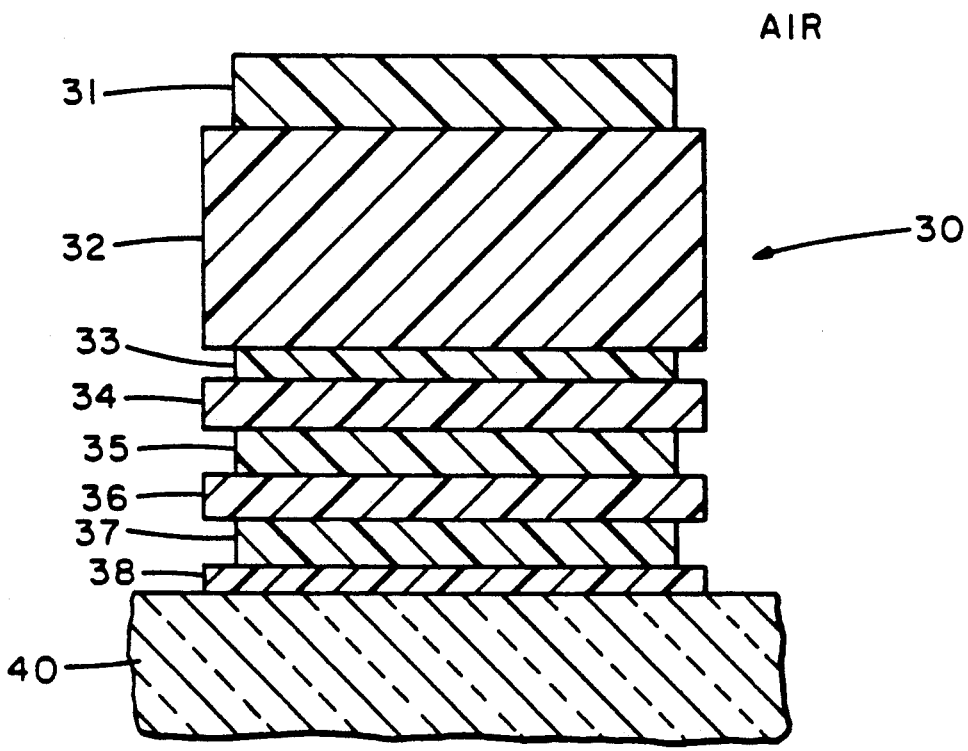
FIG. 4 schematically illustrates an embodiment of the present invention.

The structure 30 of the present invention is shown in FIG. 4. It includes eight films or layers 31-38 formed on the surface of a glass substrate or article 40. The five films 34-38 nearest the substrate may be viewed as the three film structure discussed above. These five films are bounded by two films 32 and 33 which can be varied in thickness to facilitate integration into a broad band, antireflection structure. The result is that even though the thickness of the two low index films 35 and 37 is held constant, at an appropriate thickness, and the remaining film thicknesses allowed to vary, a computer optimization of the film thicknesses, with the goal of providing the lowest possible reflection in the visible spectral range, will also produce a maximum reflection. Additionally, due to the strong absorption of UV light by the high refractive index films 34, 36 and 38, low transmission at wavelengths shorter than 390 nm will be produced.

It should be noted that the target of the optimization is to reduce the reflection in the visible spectrum to as low a value as possible. The UV reflection enhancement is provided by the constraint of the thickness of the fifth and seventh layers 35 and 37. Following the optimization procedure, the thickness relationship of the films no longer resembles the more usual forms of multilayer, antireflection coatings as seen from U.S. Pat. Nos. 3,565,509 and 3,960,441.

Some resemblance to the multilayer, long wavelength, pass filter structure is evident in the fifth, sixth and seventh layers 35, 36 and 37, although these would constitute only the center fraction of such a structure. This provides a reduction of the first sideband reflection in the transmission zone at the expense of an increase in reflection in the other sidebands.

In the present invention, the system of eight films functions as an integrated whole. In one embodiment, it yields extremely low reflection over the entire visible spectrum and beyond the red extreme of the spectrum. This performance is comparable with the best results produced by conventional, multilayer, antireflection coatings. That is, the antireflection performance of the present invention is not significantly compromised by the requirement to provide UV blocking.

Figure 5:
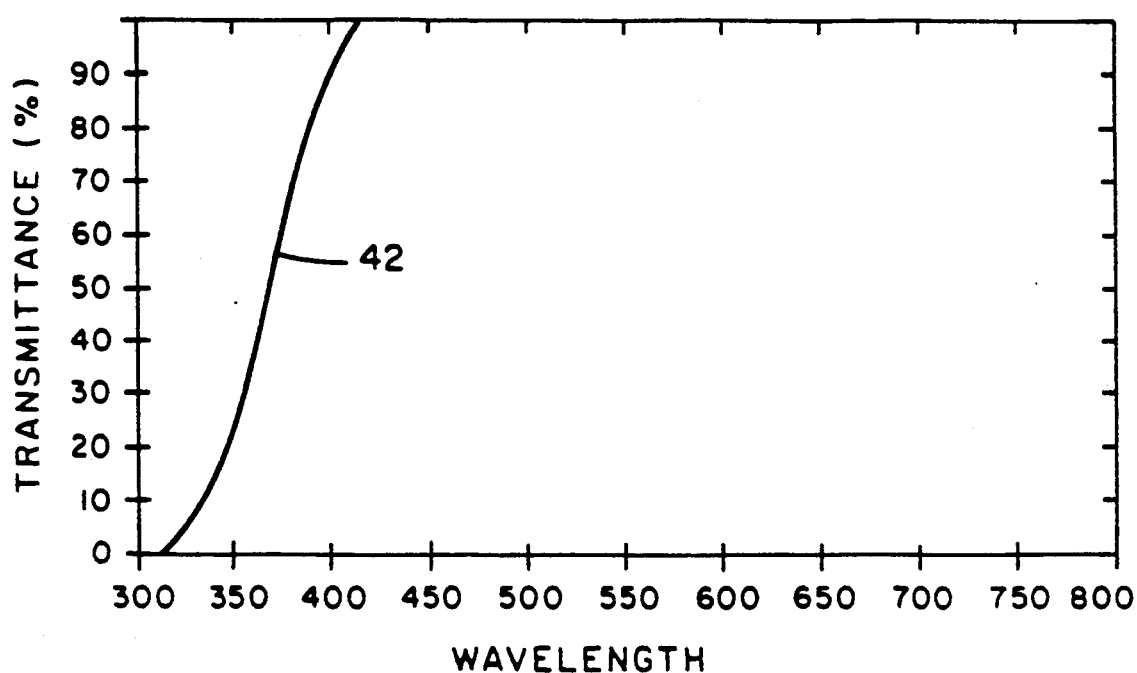
FIGS. 5 and 6 are graphs illustrating the transmittance and reflectance values, respectively, for a Rock-type structure.
Figure 6:
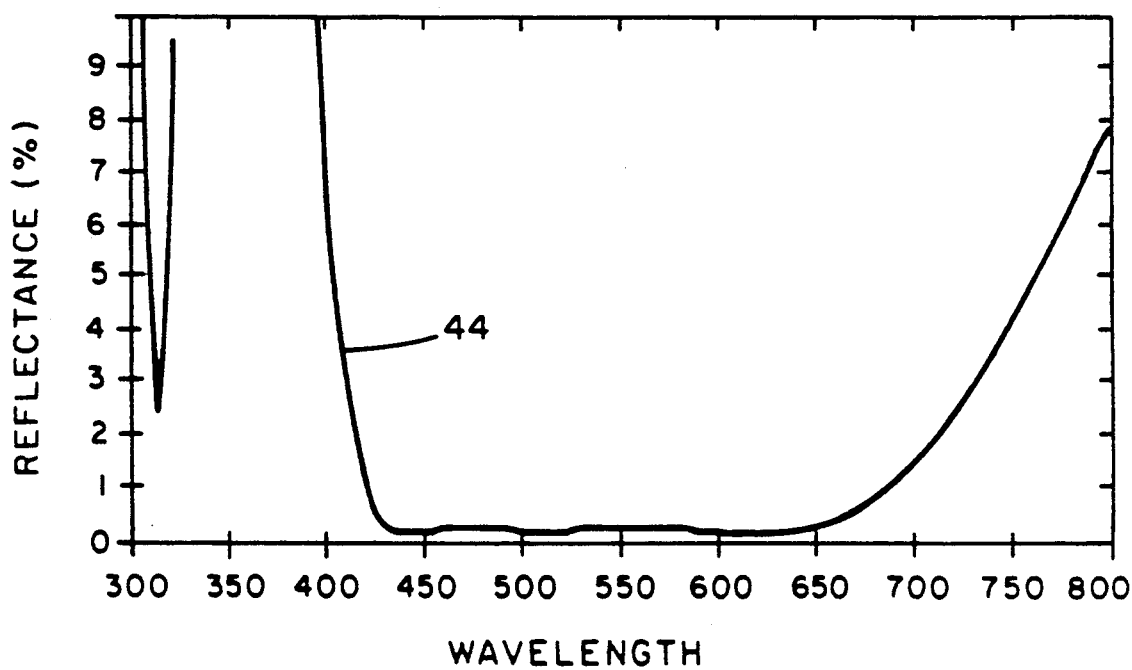

It should be realized that conventional multilayer, antireflection coatings do not come close to providing the UV blocking capabilities of the present invention. To illustrate this point, before any examples of the present invention are presented, reference is made to FIG. 5, which shows the wavelength versus transmission plot (curve 42) for a thin glass sheet ($N \cong 1.52$) having a four layer, Rock-type coating. This coating uses titanium dioxide ($TiO_2$) as the high index material and silicon dioxide ($SiO_2$) as the low index material, and is deposited on each surface of the glass sheet. The reflection versus wavelength plot (curve 44) of such a structure is shown in FIG. 6.

It should also be realized that if weakly dispersive films, non-absorbing in the near UV region of the spectrum, for example zirconium dioxide, were used for the high index material, many more films and a significantly greater layer thickness would be required to effect the UV blocking and the rapid transition from the blocking region to the transmission region. This can be seen from the seventeen layer (n=8) example of FIG. 3.

EXAMPLE 1

In this embodiment of the present invention, the goal is to provide the best antireflection performance across the visible spectrum.

The structure is shown in FIG. 4. The materials used were titanium dioxide (N=2.35 at 520 nm and 2.90 at 330 nm) in its anatase form as the high refractive index material and silicon dioxide (N=1.46 at 520 nm) as the low index material. Titanium dioxide is the preferred material because of its refractive index and because it is so dispersive; i.e., its refractive index changes with the wavelength of incident light. The optimized thicknesses of the eight layers 31-38 in structure 30 are shown in Table 1. The thicknesses are given as fractions of a wavelength ($\lambda_o$), in this case 330 nm, which shows the significant grouping of four layers 34-37 close to an optical thickness of one-quarter wavelength at 330 nm. This is the primary mechanism contributing to the onset of UV blocking.

TABLE 1

| Layer # | Material | Index (N) | Optical Thickness $\lambda_o = 330$ nm |
|---------|----------|-----------|----------------------------------------|
| Incident Medium (Air) | | | |
| 1 | $SiO_2$ | L | 0.395859 $\lambda_o$ |
| 2 | $TiO_2$ | H | 1.088748 $\lambda_o$ |
| 3 | $SiO_2$ | L | 0.173525 $\lambda_o$ |
| 4 | $TiO_2$ | H | 0.242913 $\lambda_o$ |
| 5 | $SiO_2$ | L | 0.250000 $\lambda_o$ |
| 6 | $TiO_2$ | H | 0.225679 $\lambda_o$ |
| 7 | $SiO_2$ | L | 0.250000 $\lambda_o$ |
| 8 | $TiO_2$ | H | 0.103993 $\lambda_o$ |
| Substrate (Glass N = 1.52) | | | |

Figure 7:
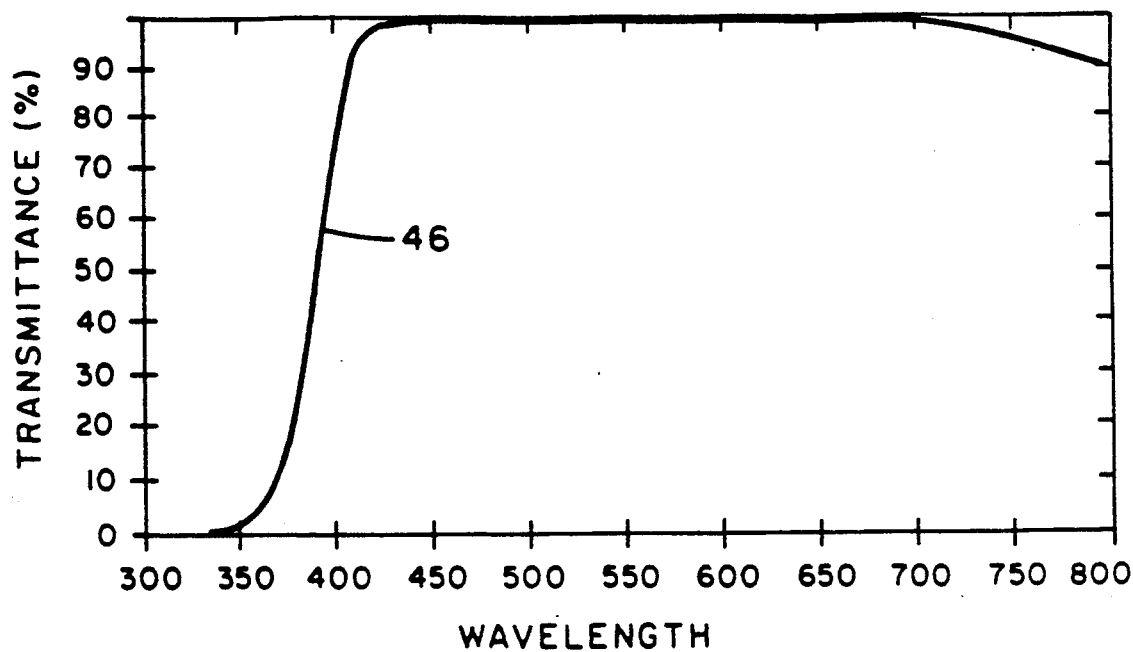
FIGS. 7 and 8 are graphs illustrating transmittance and reflectance values, respectively, for the structure shown in FIG. 4.
Figure 8:
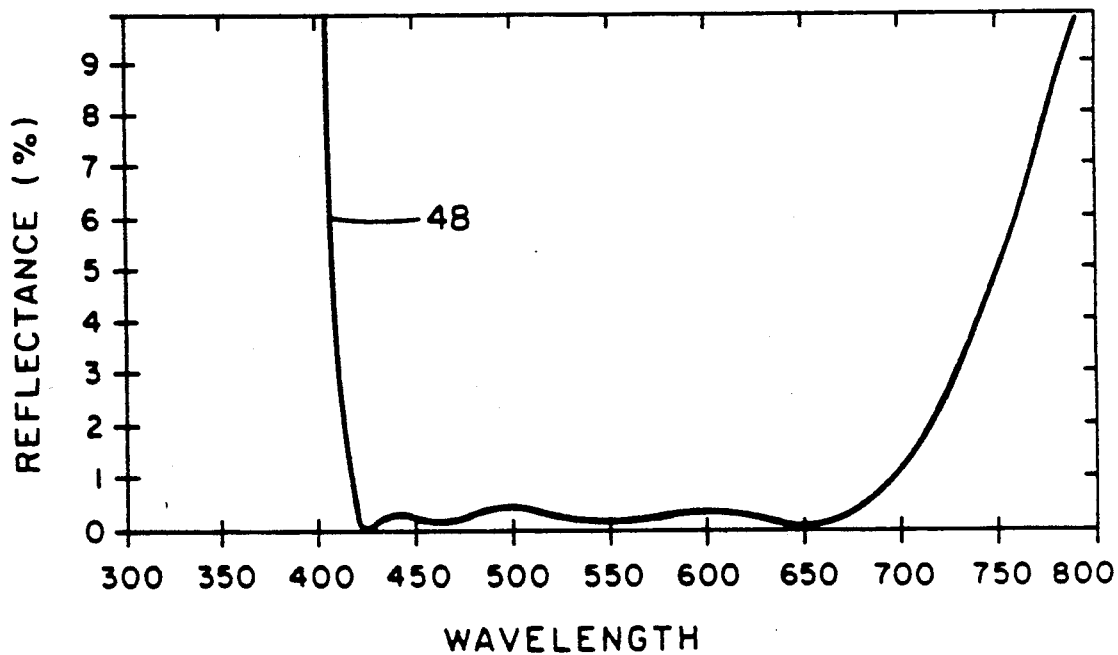

FIG. 7 illustrates how the wavelength versus transmission curve 46 for a glass sheet having a refractive index approximately equal to 1.52 would appear if the film structure of Example 1 were coated on both sides. FIG. 8 (curve 48) shows the total reflection from the two surfaces. The reflection value from both surfaces does not exceed 0.5 percent anywhere in the visible spectrum. The transmission is less than 10 percent at wavelengths shorter than 370 nm and essentially zero at wavelengths shorter than 350 nm. The transmission value is 98 percent or greater throughout the visible spectrum. This ensures that the transmission color of the coated glass is not significantly changed.

EXAMPLE 2

Figure 9:
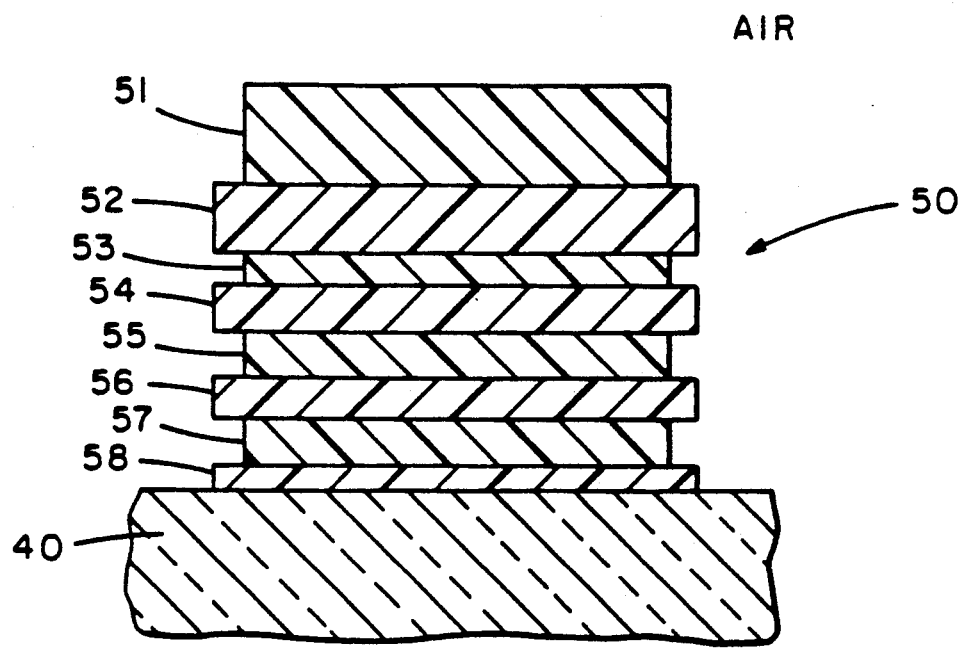
FIG. 9 schematically illustrates another embodiment of the present invention.

This embodiment is illustrated in FIG. 9. The structure 50 again includes eight layers 51-58 deposited, for example, on a glass substrate 40. In this embodiment, some constraint has been placed on the thickness of the second film 52. The reasons are twofold. First, to reduce the structure's total thickness and thus make it more economical to produce. Second, to increase UV blocking and cut on edge steepness, i.e. the slope of the response curve 60 at the 50 percent transmission point 61 (see FIG. 10), in anticipation that the optimized thickness would be closer to a quarter-wave multiple at 330 nm.

The optimized film thicknesses are shown in Table 2. As can be seen, a significant reduction of the thickness of layer 52 has been realized at the expense of only slight increases in the thickness of the other layers of structure 50. The total optical thickness in this embodiment is 2.143 $\lambda_o$ compared with 2.730 $_o$ for the embodiment of Example 1.

TABLE 2

| Layer # | Material | Index (N) | Optical Thickness $\lambda_o = 330$ nm |
|---|---|---|---|
| Incident Medium (Air) | | | |
| 1 | $SiO_2$ | L | 0.458737 |
| 2 | $TiO_2$ | H | 0.336784 |
| 3 | $SiO_2$ | L | 0.157281 |
| 4 | $TiO_2$ | H | 0.315573 |
| 5 | $SiO_2$ | L | 0.250000 |
| 6 | $TiO_2$ | H | 0.238724 |
| 7 | $SiO_2$ | L | 0.250000 |
| 8 | $TiO_2$ | H | 0.136298 |
| Substrate (Glass N = 1.52) | | | |

Figure 10:
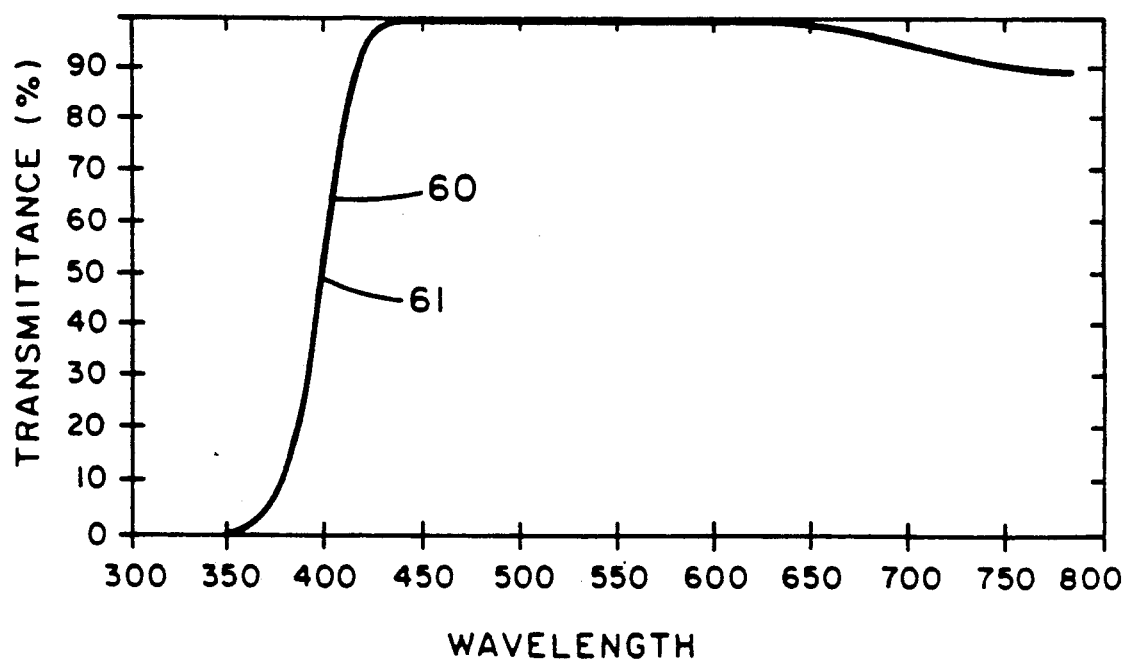
FIGS. 10 and 11 are graphs illustrating transmittance an reflectance values, respectively, for the structure of FIG. 9.
Figure 11:
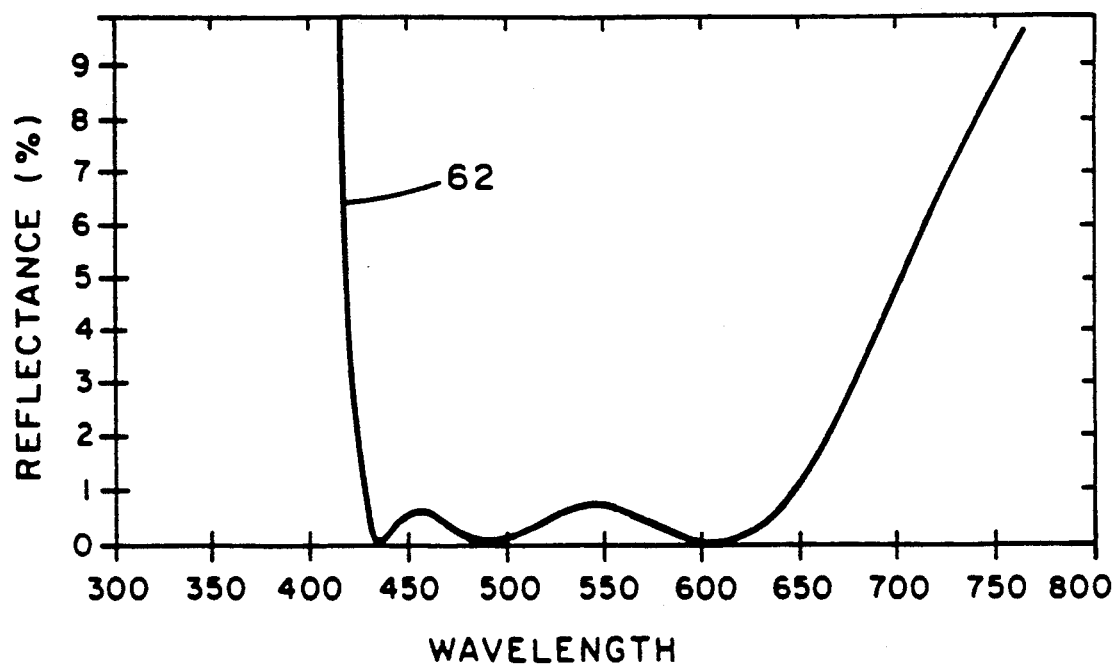

FIG. 10 illustrates how the wavelength versus transmission curve 60 for a glass sheet having a refractive index approximately equal to 1.52 would appear if structure 50 were coated on both sides of the glass. FIG. 11 (curve 62) shows the total reflection from both glass surfaces. The result of reducing the thickness of layer 52 has been to considerably narrow the reflection band. It can be seen that while the reflection value is less than 1.5 percent at 425 nm, the violet extreme of the visible spectrum, it rises to 3 percent at 675 nm, the red extreme of the spectrum. The ultraviolet rejection performance is significantly improved from that of Example 1 in that less than 1 percent transmission occurs at 365 nm or less with 10 percent or less at 380 nm.

EXAMPLE 3

In this embodiment, structure 50 is modified by increasing all film thicknesses by the same percentage. This moves the transmission cut on edge to a slightly longer wavelength. The film thicknesses shown in Table 3 are optically the same as the thicknesses shown in Table 2. The wavelength ($\lambda_o$) of the film fractional thicknesses, however, has been increased from 330 nm to 340 nm.

TABLE 3

| Layer # | Material | Index (N) | Optical Thickness $\lambda_o = 340$ nm |
|---|---|---|---|
| Incident Medium (Air) | | | |
| 1 | $SiO_2$ | L | 0.458737 |
| 2 | $TiO_2$ | H | 0.336784 |
| 3 | $SiO_2$ | L | 0.157281 |
| 4 | $TiO_2$ | H | 0.315573 |
| 5 | $SiO_2$ | L | 0.250000 |
| 6 | $TiO_2$ | H | 0.238724 |
| 7 | $SiO_2$ | L | 0.250000 |
| 8 | $TiO_2$ | H | 0.136298 |
| Substrate (Glass N = 1.52) | | | |

Figure 12:
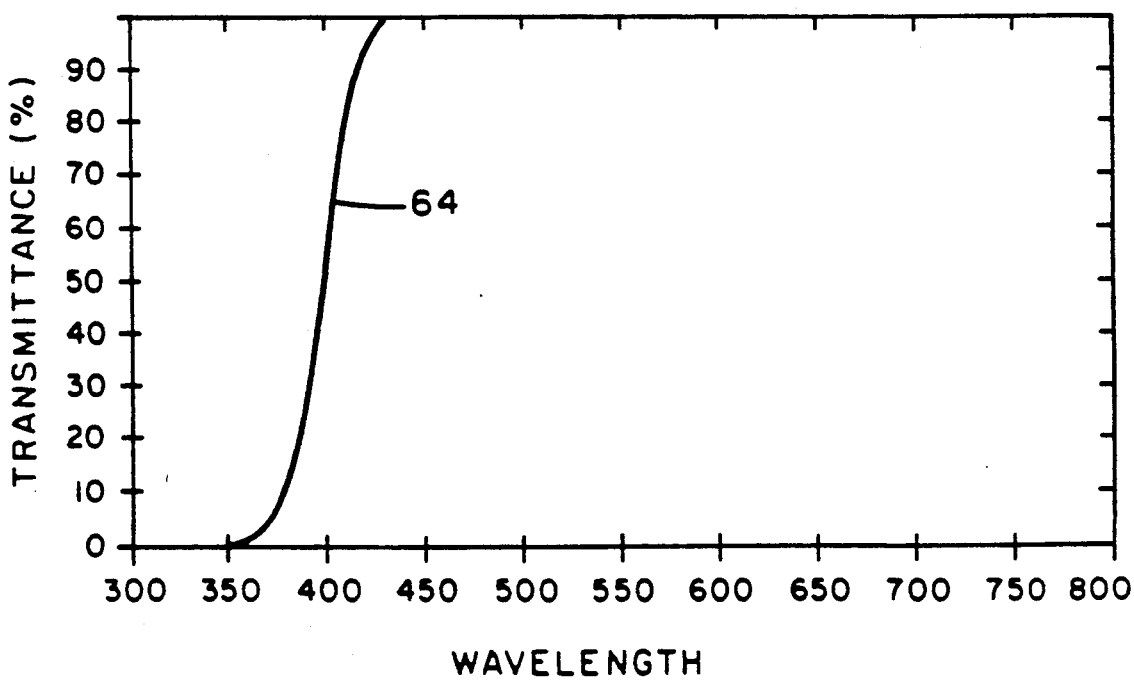
FIGS. 12 and 13 are graphs illustrating transmittance and reflectance values, respectively, for another embodiment of the present invention.
Figure 13:
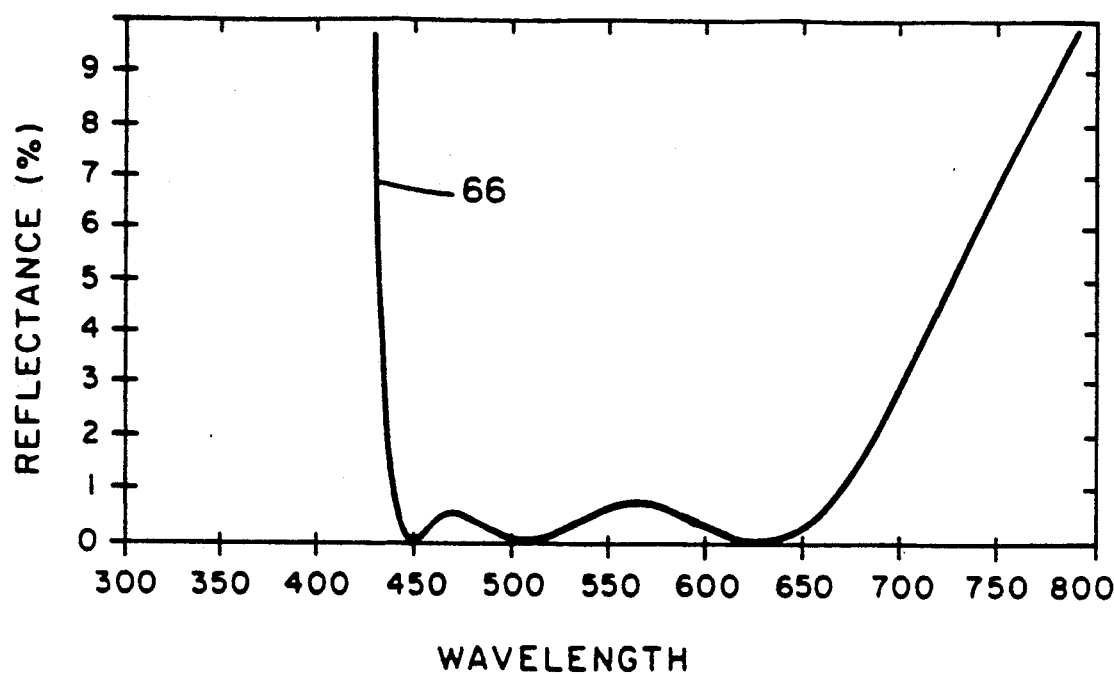

FIG. 12 shows how the wavelength versus transmission curve 64 for a glass sheet having a refractive index approximately equal to 1.52 would appear if this structure were coated on both sides of the glass. FIG. 13 (curve 66) shows the total reflection from both surfaces of the glass. Note that the reflection curve is higher at the blue end of the spectrum than at the red end, which will impart a pronounced purple color to the reflected light even though the overall reflection value would still be much less than 1.0 percent. Furthermore, the longer wavelength location of the transmission cut-on, i.e. the wavelength location at the 50 percent transmission point, causes some transmission reduction at the blue end of the spectrum which imparts a pale yellow color to the transmitted light.

The structure of this example would probably be more useful in ophthalmic applications than in art glazings, as in the latter application maintaining a minimal reflection color is important. Nevertheless, the structure will provide UV blocking and antireflection properties comparable with that realized through laminated assemblies of antireflection-coated glass with acrylic blocking filters such as UF-3. The present invention accomplishes this combination of properties using only a coating operation.

EXAMPLE 4

Figure 14:
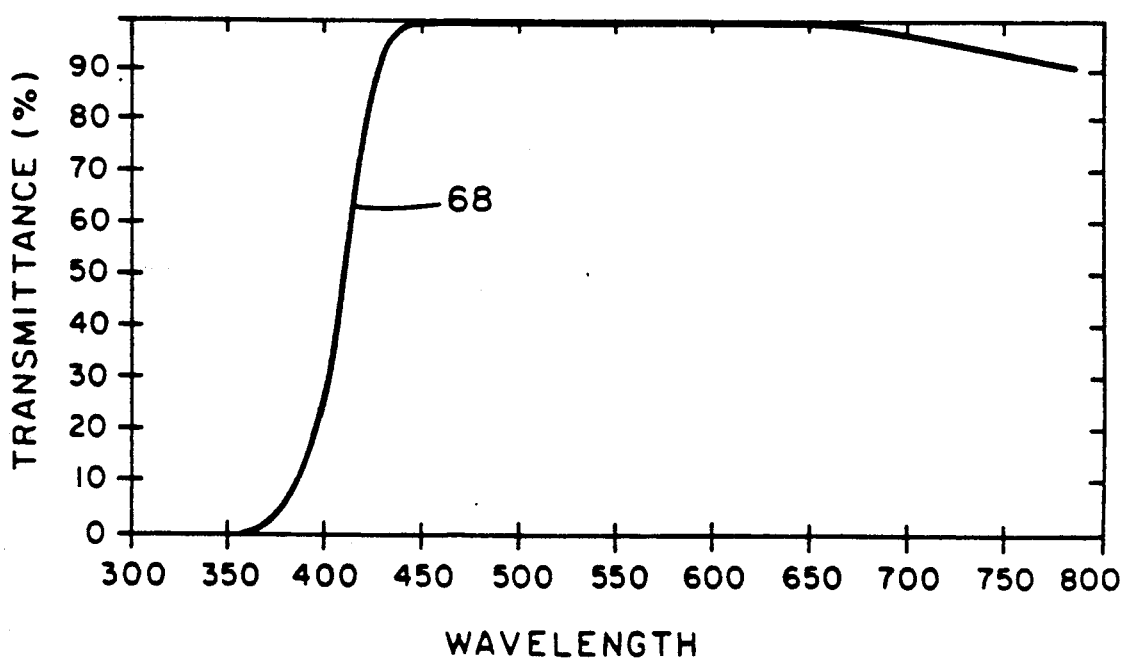
FIGS. 14 and 15 are graphs illustrating transmittance and reflectance values, respectively, for yet another embodiment of the present invention.
Figure 15:
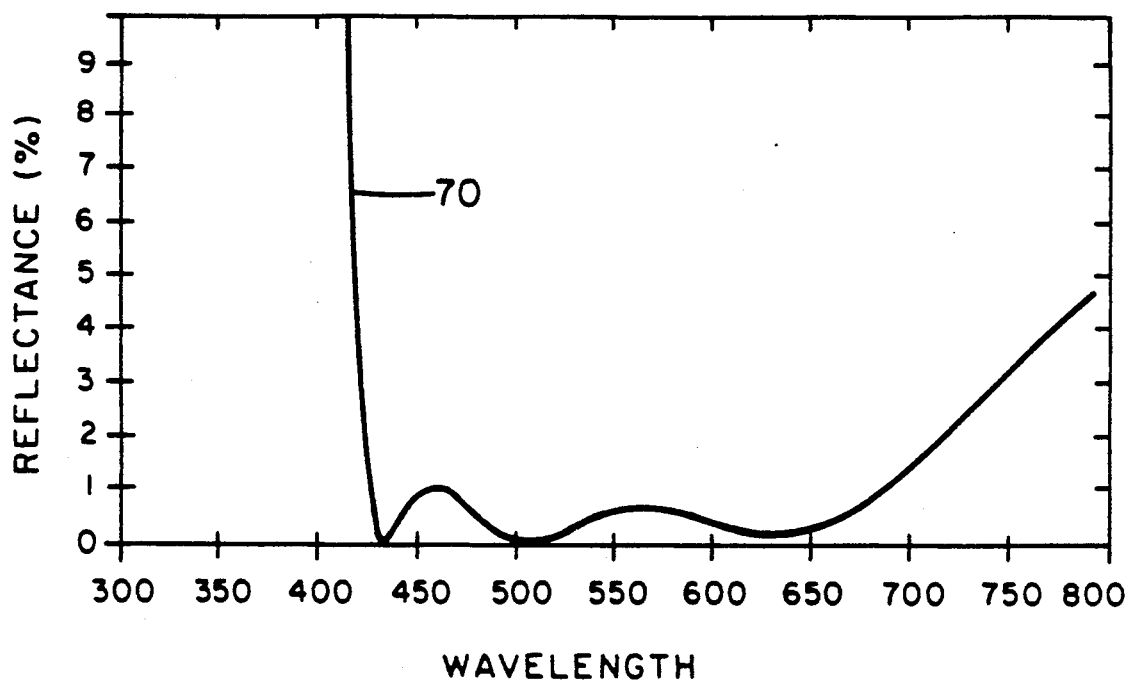

A further performance improvement can be realized by using the basic structural parameters of Example 3 and substituting magnesium fluoride ($MgF_2$) as the low index material (N=1.38). This provides for a steeper cut-on edge and improvements in the bandwidth of the antireflection region. The optimized film thicknesses are shown in Table 4. The transmission versus wavelength plot (curve 68) is shown in FIG. 14, and the reflection versus wavelength plot (curve 70) is shown in FIG. 15.

TABLE 4

| Layer # | Material | Index (N) | Optical Thickness $\lambda_o = 340$ nm |
|---|---|---|---|
| Incident Medium (Air) | | | |
| 1 | $SiO_2$ | L | 0.500471 |
| 2 | $TiO_2$ | H | 0.219616 |
| 3 | $SiO_2$ | L | 0.213652 |
| 4 | $TiO_2$ | H | 0.253475 |
| 5 | $SiO_2$ | L | 0.250000 |
| 6 | $TiO_2$ | H | 0.210004 |
| 7 | $SiO_2$ | L | 0.250000 |
| 8 | $TiO_2$ | H | 0.113960 |
| Substrate (Glass N = 1.52) | | | |

It can be seen that the optimization process has resulted in film layers 2 through 7 having approximately equal thicknesses and the outer low index film layer having an optical thickness of about one-half wave of ultraviolet light. This arrangement affords a high degree of steepness in the cut-on edge with a minimum number of layers and thickness.

The examples given herein evidence titanium dioxide ($TiO_2$) as a suitable high refractive index material and silicon dioxide ($SiO_2$) and magnesium fluoride ($MgF_2$) as suitable low index materials. It will be apparent to those skilled in the art that variations of the design are possible using other materials. The requirement for the high index material is that it have a high dispersion and absorption in the near UV region of the spectrum, and be transparent in the visible region. Materials exhibiting these properties include, but are not limited to, cerium oxide, bismuth oxide, zinc oxide, zinc sulfide, and iron oxide. As noted, the preferred material is titanium dioxide. The low refractive index material should, in general, have as low a refractive index as possible consistent with a reasonable level of durability. Other low index materials include, but are not be limited to, thorium fluoride, aluminum oxyfluoride and magnesium oxyfluoride.

It should be pointed out that while the examples shown comprise only two different materials in a particular design, similar structures could be designed with two or more high index materials and/or two or more low index materials, or even a material such as aluminum oxide of some intermediate refractive index.

In certain cases, it may be advantageous to use mixtures of materials or complex compounds. A mixture of cerium oxide and zinc oxide could be used for the high index films and a mixture of silicon dioxide and magnesium fluoride for the low index films. Other mixtures might be chosen to suit a particular deposition technique or to take advantage of a particular optical or physical property of a material.

While common plate glass has been used as the substrate material in the computational examples described above, variations of the invention could be deposited on plastic materials or special glasses that may be required for ophthalmic or other applications.

Modifications of the design concept are also possible. The design may be improved by adding, subtracting, subdividing, or altering the thickness of one or more layers. The designs may be modified, for example, to provide a flatter response in the visible, antireflection band or to change the location or the slope of the reflection cut-on edge.

The examples provided have been chosen for compatibility with in-line sputtering as well as thermal evaporation techniques. However, it should be evident, given the range of possible useful materials, that any of the common deposition film techniques, chemical or physical, could be used alone or in combination to deposit layer systems according to the present invention. Examples might include, but are not limited to: wet chemical immersion, chemical vapor deposition, plasma assisted chemical deposition, ion plating, and ion beam deposition.

Examples have been shown of an invention based on a unique multilayer film structure which integrates effective blocking of ultraviolet radiation into a highly efficient antireflection coating. The total optical thickness of the structures in the examples range from a maximum of 1.7 wavelengths of green light (wavelength $\lambda_g = 520$ nm) to 1.27 $\lambda_g$. Conventional high efficiency, broad band, antireflection coatings, without UV blocking properties, and designed only with the goal of reduced reflection, range in total optical thickness from 0.9 $\lambda_g$ to 1.5 $\lambda_g$. Thus, the present invention provides UV blocking with a total thickness increase of only approximately 30 percent. Additionally, the multilayer structure of the present invention is no more complex than the most complex of conventional designs. The present invention has application in providing UV protection and antireflection properties for corrective and protective eyewear. The invention also has application in providing protection from photochemical damage to works of art while additionally providing reduced glare from the protective glazing.

The present invention has been described in terms of a number of embodiments. The invention, however, is not limited to the embodiments depicted and described. Rather, the scope of the invention is defined by the appended claims.

What is claimed is:

1. An antireflection and ultraviolet light absorbing coating, comprising:
    eight layers wherein adjoining layers alternate between high and low refractive index materials;
    the index of refraction of said high refractive index materials greater than about 2.10 at a wavelength of 520 nanometers and greater than about 2.50 at a wavelength of about 330 nanometers;
    the index of refraction of said low index materials less than about 1.50 at a wavelength of about 520 nanometers;
    the layer adjacent of a surface on which the coating may be deposited having said high refractive index;
    the two layers of low index material nearest said surface each having an optical thickness at a wavelength of about 330 nanometers of about one-quarter of a wavelength; and
    said eight layers together having a total optical thickness between about 1.27 and 1.7 wavelengths at a wavelength of about 520 nanometers.

2. The coating of claim 1 wherein said high refractive index material is titanium dioxide.

3. The coating of claim 1 or 2 wherein said low refractive index material is silicon dioxide.

4. A coating formed on the surface of a substantially transparent substrate, comprising:
    eight layers of alternating high and low refractive index materials such that each layer has a refractive index different from that of any adjoining layer;
    the layer adjacent said substrate having a high refractive index and each layer of high refractive index material formed from titanium dioxide;
    the index of refraction of each low refractive index material less than about 1.50 at a wavelength of about 520 nanometers;
    the layer farthest from said substrate having said low refractive index and an optical thickness at a wavelength of about 330 nanometers of about 0.39 wavelengths, and the layer adjacent said substrate having said high refractive index and an optical thickness at a wavelength of about 330 nanometers of about 0.10 wavelengths;
    the two layers of low refractive index material nearest said substrate each having an optical thickness at a wavelength of about 330 nanometers of about one-quarter of a wavelength; and said eight layers together having a total optical thickness between about 1.27 and 1.7 wavelengths at a wavelength of about 520 nanometers.

5. The coating of claim 4 wherein said low refractive index material is selected from the group consisting of: silicon dioxide, magnesium fluoride, thorium fluoride, aluminum oxyfluoride, and magnesium oxyfluoride.

6. An antireflection and ultraviolet light absorbing coating formed on the surface of an article, comprising:
    eight layers of alternating high and low index refractive index materials such that each layer has a refractive index different from that of any adjoining layer;
    the eighth layer of a material adjacent said article having a refractive index greater than about 2.10 at a wavelength of about 520 nanometers and greater than about 2.50 at a wavelength of about 330 nanometers and an optical thickness at a wavelength of about 330 nanometers of about 0.13 wavelengths;
    the seventh layer of material having a low refractive index less than about 1.50 at a wavelength of about 520 nanometers and an optical thickness at a wavelength of about 330 nanometers of about one-quarter of a wavelength;
    the sixth layer of material having said high refractive index;
    the fifth layer of material having said low refractive index and an optical thickness at a wavelength of about 330 nanometers of about one-quarter of a wavelength; and said eight layers together having a total optical thickness between about 1.27 and 1.7 wavelength at a wavelength of about 520 nm.

7. The coating of claim 6 wherein said high refractive index material is titanium dioxide.

8. The coating of claim 7 wherein said low refractive index material is silicon dioxide.

* * * * *

UNITED STATES PATENT AND TRADEMARK OFFICE
CERTIFICATE OF CORRECTION

PATENT NO. : 5,332,618
DATED : July 26, 1994
INVENTOR(S) : R. Russel Austin

It is certified that error appears in the above-indentified patent and that said Letters Patent is hereby corrected as shown below:

Column 7, line 4, after "2.730" please insert ---$\lambda$---

Column 8, table 4 therein, rows 1, 3, 5 and 7 thereof, please remove "SiO$_2$ and substitute therefor ---MgF$_2$---

Signed and Sealed this

Eighteenth Day of April, 1995

*Attest:*

BRUCE LEHMAN

*Commissioner of Patents and Trademarks*

*Attesting Officer*